Figure 1:
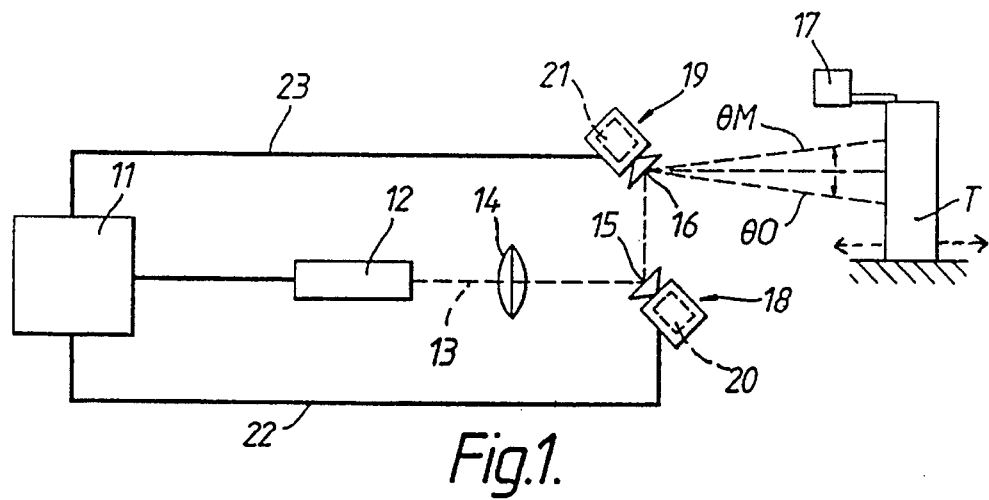

United States Patent [19]

Stevens

[11] Patent Number: 5,600,478
[45] Date of Patent: Feb. 4, 1997

[54] LASER MARKING ARRANGEMENTS

[75] Inventor: William H. Stevens, Hull, Great Britain

[73] Assignee: Imaje SA, France

[21] Appl. No.: 185,854

[22] PCT Filed: Jul. 26, 1991

[86] PCT No.: PCT/GB91/01264

§ 371 Date: Jul. 1, 1994

§ 102(e) Date: Jul. 1, 1994

[87] PCT Pub. No.: WO93/03456

PCT Pub. Date: Feb. 18, 1993

[51] Int. Cl.[6] ................................................. G02B 26/08
[52] U.S. Cl. .................... 359/223; 359/201; 359/212; 359/224; 347/260
[58] Field of Search .................... 359/196–199, 359/201–202, 212–215, 223–224, 230, 299, 315; 250/234–236; 347/129–130, 132–134, 224–225, 250, 110, 259, 260; 346/78, 112

[56] References Cited

U.S. PATENT DOCUMENTS

| | | | |
|---|---|---|---|
| 4,233,612 | 11/1980 | Hirayama et al. | 346/160 |
| 4,307,930 | 12/1981 | Saito | 359/201 |
| 4,791,591 | 12/1988 | Asanuma et al. | 359/201 |
| 4,971,413 | 11/1990 | Inoue | 250/236 |

*Primary Examiner*—James Phan
*Attorney, Agent, or Firm*—William A. Drucker

[57] ABSTRACT

The disclosure relates to a laser marking system, using a displaceable mirror to cause the path of the laser beam to scan in one direction. The mirror is conveniently controlled by at least one flexure hinge driven by a piezo electric device, an electro-strictive device or a magneto-strictive device. In one disclosed embodiment two mirrors (15,16,) are provided, each mirror (15 or 16,) having a flexure hinge device (18,19) individual thereto, and the displacements applied to the flexure hinge devices (18,19,), via respective driving devices (20,21,), cause the mirrors (15,16,) to scan the path of the laser beam (13) in a series of steps in one direction of scan. A computer (11), arranged to drive the flexure hinge driving devices (20,21,), also controls the firing of the laser (12) in accordance with a predetermined program.

16 Claims, 3 Drawing Sheets

5,600,478

LASER MARKING ARRANGEMENTS

This invention relates to lasers and, more particularly, to laser dot-matrix marking and printing, hereinafter referred to as "marking".

Laser marking is well known in the art and in one such laser marking arrangement a pulsed laser beam is directed through an optical system including a laser beam deflecting means, the beam deflecting means is controlled by a computer and a programme in the computer controls the deflecting means to cause the path of the laser beam to be traversed through a fixed angle, thus to sweep or "scan" a target.

For most such arrangements the laser beam is caused to scan in one plane and the target is displaced in a direction at right angles to the said plane of laser beam displacement whereupon the scan of the laser beam in combination with the target displacement, allows marking over an area of the target.

The computer further controls the firing of the laser, in pre-programmed positions along the scan path of the laser beam over each or selected scans, whereupon a desired dot-matrix marking over an area of the target is obtained.

Such an arrangement, comprising a computer controlled laser with a laser beam deflecting means arranged to direct the laser beam to scan a target in one plane is, hereinafter referred to as "a laser marking system of the type defined".

The target area may comprise a laminate, the external layer of which is burnt away or vaporized by the laser beam to expose the second layer which is differently coloured from the surface layer, or the heat generated by the beam may cause a distinctive discoloration of the target surface or the beam may etch the surface of the target.

Any given target surface to be marked by a laser beam requires a minimum energy density of the beam over a predetermined dwell period to produce a satisfactory marking of the surface. The length of the laser pulse required for a given target surface is inversely proportional to the available laser power and proportional to the area of the target surface in the path of the laser beam when the laser is pulsed.

A problem exists with prior art laser marking systems of the type defined in that currently proposed beam deflecting means are relatively slow to operate or are very expensive and inefficient.

By way of one example, the United Kingdom Patent Publication No. 2133352 discloses a laser marking system of the type defined wherein the output beam of an RF excited wave guide or non-wave guide CO2 laser is directed through an acousto-optic deflector, electronic control means synchronized with the laser drive means drive the acousto-optic deflector so as to selectively deflect the laser pulses in space to produce a one-dimension array of pulses, and an optical system focuses the pulses in said array onto an article to be marked. Acousto-optic deflectors are relatively expensive, as also is the optical system provided to receive the output beam from the acousto-optic deflector to focus said beam and to give an acceptable scan dimensions for the focussed beam.

In other embodiments disclosed in the United Kingdom Patent Publication No 2133352 the acousto-optic deflector is replaced by a mirror arrangement, which may include a multi-faceted spinning mirror or a two mirror system in which one mirror is fixed and the other mirror is displaced by an electronic device, such as a piezoelectric transducer.

An object of the present invention is to provide a laser beam deflecting means of relatively cheap construction which affords a relatively wide range of scan, which affords a high degree of accuracy for the direction of the beam and which, in practise, offers a relatively fast rate of operation.

According to the present invention there is provided a laser marking arrangement wherein a laser beam deflecting means causes the path of a laser beam to scan in one plane, a target is displaced in a direction at right angles to the plane of scan and a computer controls the firing of the laser at pre-programmed positions along the scan path, over each or selected scans, whereupon a desired dot-matrix marking over an area of the target is obtained, the laser beam path deflecting means includes a mirror arranged in the path of the laser beam, a mirror displacing device is arranged to displace the mirror between two extreme positions defining a predetermined angle and said predetermined angle defines the angle of scan for the path of the laser beam, characterised in that the mirror displacing device is arranged to displace the said mirror through said predetermined angle in one direction at a rate of displacement faster than the rate of displacement in the other direction and the laser is controlled to fire only whilst the mirror is being traversed in the direction affording the slower rate of displacement.

Preferably the laser marking arrangement is characterised in that the mirror displacing device is arranged to displace the laser beam path through its predetermined angle of displacement in a series of steps and the laser is controlled to fire only when the path of the laser beam is relatively stable between successive said steps.

In one preferred embodiment the laser marking arrangement is characterised in that said laser beam deflecting means includes two mirror displacing devices.

In one such an embodiment the marking arrangement is characterised in that beth said mirror displacing devices act on the mirror to displace the said mirror through its said predetermined angle of displacement.

In another embodiment the laser marking arrangement is characterised in that each said mirror displacing device is arranged to displace a mirror individual thereto and the path of the laser beam is deflected by both mirrors to step through the full scan angle.

Preferably with such an embodiment one of said mirror displacing devices has a smaller displacement than the other of said devices and that displacing device having the smaller displacement makes a plurality of complete displacement cycles for each complete displacement cycle made by the other displacing device.

Preferably the laser marking arrangement is characterised in that the, or each, mirror displacing device includes an electrical device which undergoes a change of shape in response to electrical signals.

Preferably the laser marking arrangement is characterised in that the, or each, said electrical device is of the group including piezo-electric devices, electro-strictive devices and magneto-strictive devices.

Preferably the, or each, mirror displacing means includes a flexure hinge device.

Preferably the laser marking arrangement is characterised by a computer, arranged to drive the mirror displacing means and to control the firing of the laser in accordance with a predetermined programme.

Figure 2:
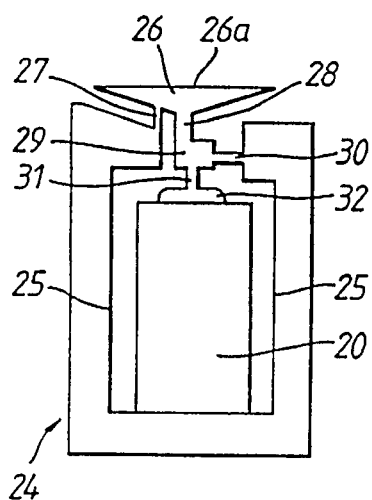
Figure 3A:
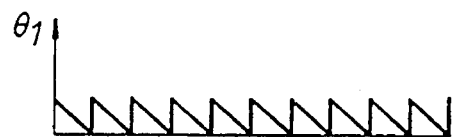
Figure 3B:
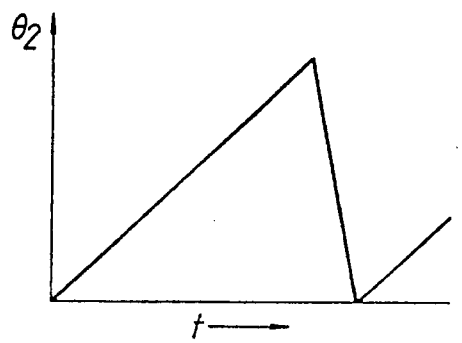
Figure 3C:
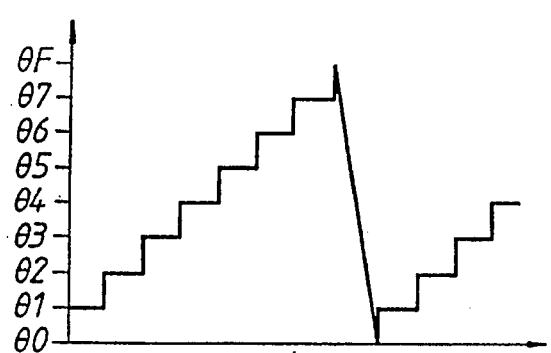
Figure 4:
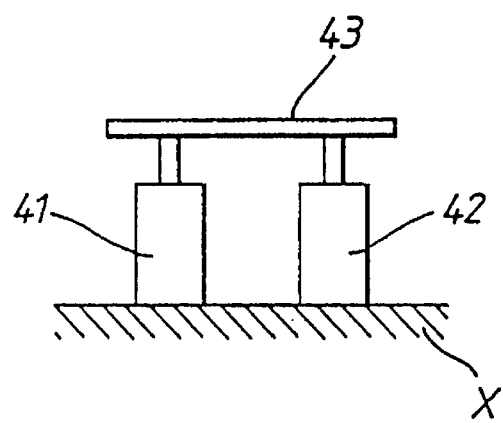
Figure 5:
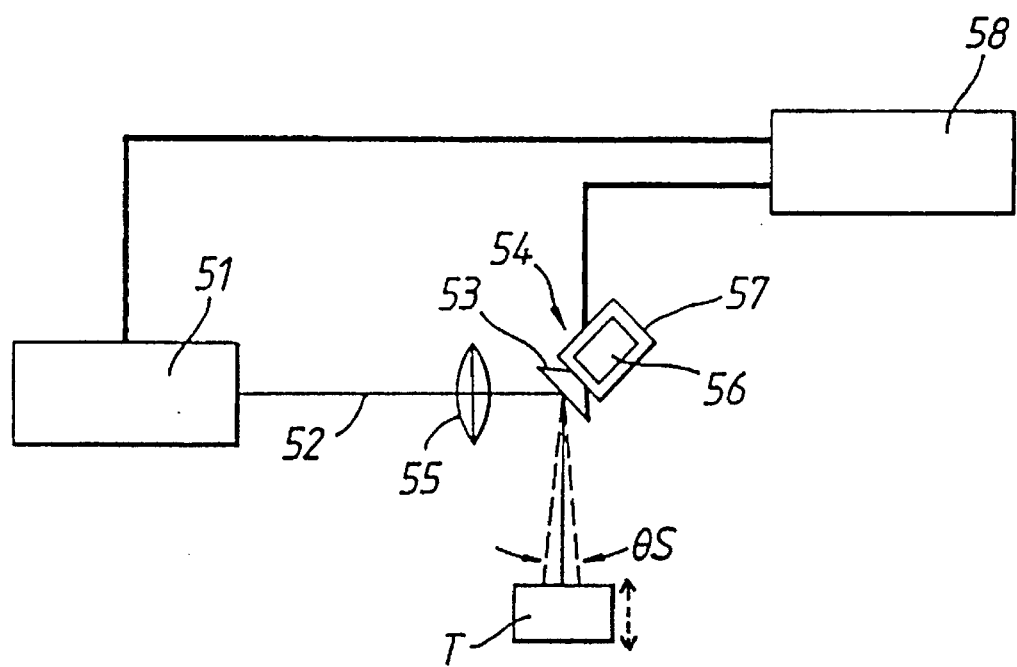

The invention will now be described further by way of example with reference to the accompanying drawings in which;

FIG. 1 shows, diagrammatically, a laser marking arrangement in accordance with the invention, FIG. 2 shows, in greater detail, a displacing device suitable for use in the FIG. 1 embodiment, FIGS. 3A, 3B and 3C, show, graphically, the progression of the deflection in a scanning cycle for the apparatus shown in FIG. 1, FIG. 4 shows, diagrammatically, a second embodiment for a displacing device, FIG. 5 shows, diagrammatically, a further arrangement for a laser marking arrangement.

Figure 6:
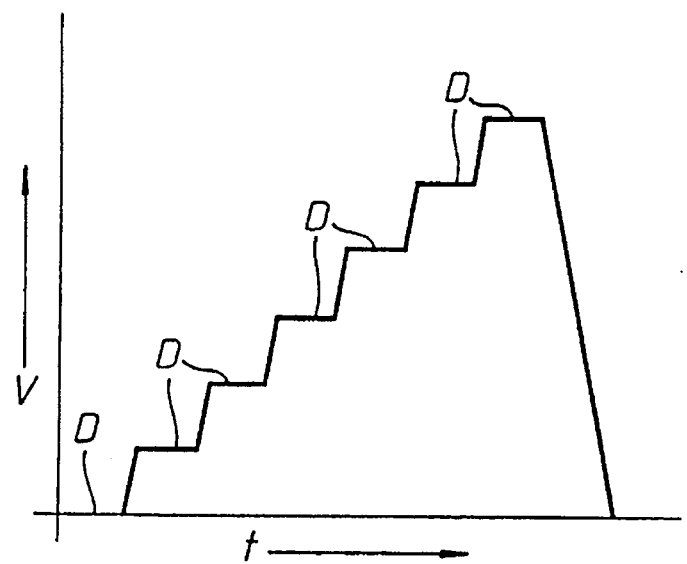
Figure 7:
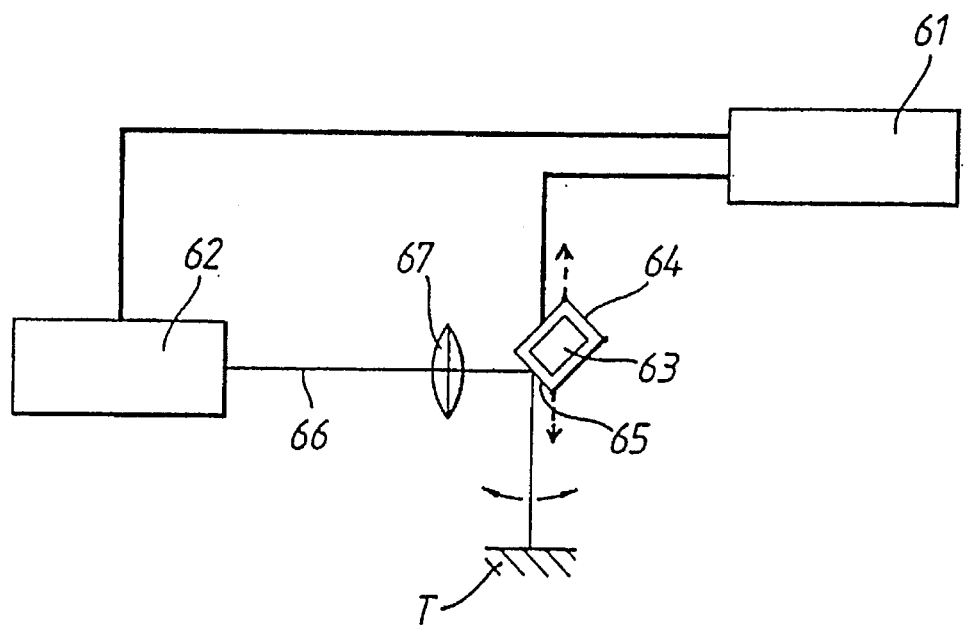

FIG. 6 shows, graphically, the voltage form applied to the displacing device shown in FIG. 5 and, FIG. 7 shows, diagrammatically, a further laser marking arrangement in accordance with the invention.

In the laser marking arrangement illustrated in FIG. 1 a computer 11 controls the firing of a pulsing laser 12. The beam 13 from the laser 12 passes through a focussing lens 14 to a first mirror 15 and is deflected thereby to a second mirror 16 which directs the beam 13 to a target T to be marked. The target T is displacing at uniform speed in a direction at right angles to the scanning plane of the beam 13.

The computer 11 includes a programme for a desired marking to be applied to the target T.

A sensing device 17 in the path of the target T detects the leading edge of target T entering the marking zone and initiates the computer printing programme.

The mirror 15 is mounted on a displacing device 18, the second mirror 16 is mounted on a displacing device 19 and the devices 18 and 19 include electrical devices 20 and 21 respectively which receive operating signals from the computer 11 via lines 22 and 23 respectively.

The electrical devices 20 and 21 comprise devices which undergo a change of shape in response to electrical signals and my conveniently comprise electro-strictive devices, magneto-strictive devices, or piezo-electric devices. The signals given to said devices 20 and 21 on lines 22 and 23 cause dimensional change of said devices 20 and 21 to effect displacement of the mirror displacing devices 18 and 19 respectively.

One example of a mirror displacing device 18 is shown in FIG. 2 and comprises a so-called flexure hinge device, wherein a block 24 of spring steel has a rectangular opening 25 through its mid-regions and has one end region (the upper end as viewed in FIG. 2) machined to define an inverted prism block 26 supported by two narrow sections 27 and 28 of the block material.

The section 27 extends to the main body of the block 24 and the section 28 terminates at its lower end in a block 29, which connects to the main body of the block 24 via a narrow section of block material 30 substantially at right angles to the section 28.

A narrow section of block material 31 extends downwardly from the block 29 and has a shoe 32 formed on its bottom end.

The electrical device 20, in this example a piezo-electric device, fits snugly between the undersurface of the shoe 32 and the internal surface of the rectangular opening 25 remote from the shoe 32.

The flat surface 26a on the prism block 26 is highly polished to comprise the mirror 15.

With the flexure hinge device as described above the narrow section 27, the narrow section 28, the narrow section 30 and the narrow section 31 all comprise flexure "hinges" and when a signal on the line 22 causes the electrical device 20 to expand, the block 29 is displaced upwardly, against the resistance to bending of the sections 27, 28, 30 and 31 and the upward loading on the block 29 causes the prism block 26 to deflect and change the plane of the mirror surface 26a.

When the prism block 26 has fully deflected and the signal on line 22 is terminated the prism block 26 is rapidly returned to its start position by the energy stored in the sections 27, 28, 30 and 31.

It will be appreciated that the resonance frequency of the flexure hinge devices 18 or 19 can be changed by altering the characteristics of the sections 27, 28, 30 and 31 and thus the displacing device 19 is identical to the flexure hinge illustrated in FIG. 2 and described above, with the exception that the sections 27, 28, 30 and 31 are longer to allow the deflection of the mirrored surface 26a to be greater than that of the device 18. The extension of the electrical device 21, on receipt of a signal on the line 23, will also be greater than that of the device 20.

The flexure hinge device illustrated in FIG. 2 and described above is only one simple embodiment intended to illustrate the operation of such a hinge device and, as is well known in the art of flexure hinges, such flexure hinge devices can afford a wide range of deflections and can be readily designed to afford a desired displacement under the action of a selected electrical device.

The displacing device 18 is arranged to make a number of complete displacement cycles during each complete displacement cycle of the displacement device 19.

FIG. 3A illustrates the wave form for the displacement of the mirror 15 and, as will be readily seen from the figure, the wave form is a saw-tooth form with the expansion of the device 20 generating the slope and the return, under the action of the sections 27 and 30 of the flexure hinge, almost vertical.

FIG. 3B illustrates the wave form for the displacement of the mirror 16 and, as will be seen from the FIG. 3B, the wave form is also a saw tooth form with the expansion of the device 21 generating the slope and the return under the action of the sections 27, 28, 30 and 31 of the flexure hinge device almost vertical.

FIG. 3C shows, graphically, how the high frequency, low amplitude displacements of the mirror 15 superimposed on the low frequency, high amplitude displacements of the mirror 16 produce a "staircase" wave form for the displacement of the path of the laser beam 13 reflected by the mirror 16 towards the target T and whereby the laser beam path is angularly displaced through a series of small angular displacements, with a dwell period between the adjacent displacements, whilst the device 21 is extending and returns rapidly (in one cycle of the mirror 15) when the signal to the device 21 is terminated.

The base line $\theta 0$ and the final position $\theta F$ before the device 21 returns determine the extreme positions for the laser beam path but, as the laser 12 is arranged to fire only when the path of the laser beam is stationary the laser can fire only at positions $\theta 1$ to $\theta 7$ inclusive and thus the angle $\theta 1$ to $\theta 7$ defines the effective scan angle $\theta 0$ to $\theta M$ of the laser beam 13.

Thus, as stated above, the laser 12, under the control of computer 11, is arranged to fire only whilst the laser beam path is in a dwell period $\theta 1$ to $\theta 7$ inclusive and dwell periods $\theta 1$ to $\theta 7$ inclusive define the total number of spot markings which can be made in each scan of the path of the laser beam 13.

It will also be seen that as the laser 12 fires only whilst the path of the laser beam 13 is in a dwell period, the length of the laser pulse can be equal to the length of the dwell period and thus a most effective marking of the target T can be obtained.

In FIG. 3C there are seven dwell periods $\theta 1$ to $\theta 7$ inclusive for each complete displacement movement of the mirror 16 and, if the laser beam 13 scans the target T five times, the laser can be controlled to mark a character on a 7×5 dot-matrix arrangement.

The target T may comprise any article to be marked and in practise a plurality of targets T may be displaced successively through the path of the laser beam 13 by a conveying means and said targets T can be marked with identical or different marking, dependant upon the programme or programmes stored in the computer.

As laser 12 is fired in response to signals from the computer, which contains the desired programme of the marking to be applied to the target T, and as the mirror 16 can perform any desired number of scans for the target area of each target T passing through the path of the beam 13, the laser 12 can be fired to produce any desired dot-matrix pattern the computer can accept.

As the expansion of a piezo-electric device in a flexure hinge device as proposed herein is very rapid the marking arrangement according to the invention can work at very high speeds.

Further, as the expansion of a piezo-electric device, when actuated, is constant within very fine limits over a large number of operations the laser marking system proposed by the present invention maintains its accuracy over long operating periods with the minimum of maintenance.

FIG. 4 shows a second embodiment for displacing the laser beam 13 and wherein two electrical devices 41,42, which may be of identical form to the devices 20 and 21 respectively, act between a fixed base X and a common mirror 43. As with the earlier embodiment the computer sends signals to the devices 41 and 42 to cause said devices to expand and contract, the device 41 expanding and contracting with high frequency, low amplitude, whilst the device 42 operates at low frequency high amplitude.

Thus, when operating with the mirror 43 in the path of the laser beam 13, the surface of the mirror presented to the laser beam 13 displaces in a manner approximating a "staircase" wave form to displace the laser beam path through a succession of small angular displacements with a dwell period between said successive angular displacement movements.

In the embodiment illustrated in FIG. 5 a laser 51 is arranged to direct its beam 52 onto a mirror 53, supported by a displacing device 54, and the mirror 53 reflects the beam 52 towards a target T displacing in the direction perpendicular to the plane of the scan angle θS of the laser beam 52. A focussing lens 55 is located to focus the beam 52 to the desired spot size at the plane of marking on the target T.

The displacing device 54 may be similar to the displacing device illustrated in FIG. 2 and will then comprise an electrical device 56 and a flexure hinge device The displacing device 54 is driven by a computer 58 which extends a stepping voltage signal, as shown in FIG. 6, to the electrical device 56 and whereupon the electrical device 56 extends in a series of steps to cause the path of the laser beam to sweep through its fixed angle of scan.

Thus, with the embodiment as described and on detection of a target to be marked, the computer 58 causes the mirror 53 to step the path of the laser beam 52 through its fixed angle of scan and the computer 58 activates the laser 51, in accordance with a predetermined programme for marking, whilst the path of the laser beam 52 is substantially stable between successive steps of the mirror 53, thereby to obtain the pulse length of the beam on each spot on the target necessary to effectively mark the target.

FIG. 6 shows voltage V plotted against time t for the signals transmitted by the computer to the electrical device 56 in the FIG. 5 embodiment and wherein the stepping voltage defines 7 dwell periods "D" within which the voltage is substantially stable and the laser 51 can be fired.

In all the above embodiments the dwell period between successive steps when the laser beam is held substantially stable will be arranged to be of sufficient duration as to allow the laser beam to effectively mark the target.

In all the foregoing examples the laser beam is stepped through its angle of scan and the laser is fired only during dwell periods of the laser beam and, with the laser beam static when the laser is fired, the marking spots applied to the target are of substantially uniform shape and configuration and a most accurate and clear marking of the target is thereby obtained.

In the example illustrated in FIG. 7 a computer 61 controls a laser 62 and extends signals to a piezo-electric device 63 driving a flexure hinge device 64. The flexure hinge device 64 supports a mirror 65 and the laser beam 66 from the laser 62 passes through a focussing lens 67 to strike the mirror 65 and be deflected thereby onto a target T.

The computer 61 sends a continuously increasing signal to the piezo-electrical device to cause said device to continuously expand and, on termination of the signal, the piezo-electrical device immediately returns to its start position.

Thus, with this arrangement, the mirror 65 is displaced continuously in one direction under the action of the piezo-electric device and, contrary to the previous examples, the computer 61 is arranged to fire the laser 62 whilst the mirror 65 is being displaced in the direction caused by the expansion of the piezo-electric device 63.

The computer 61 is arranged to fire the laser 62 at a number of preselected signal strengths for the continuously increasing signal to the piezo-electric device 63, and thus at a predetermined number of spaced apart locations along the path of scan, so that successive firings of the laser 62 are spaced apart in the scan direction of the laser beam.

Whilst this method of marking does require the mirror 65 to be displacing when the laser 62 fires, and some elongation, in the direction of scan, of the spot applied to the target will take place, practise has shown that with a relatively short laser pulse an acceptable marking of the target T can be obtained.

I claim:

1. A laser marking arrangement wherein a laser beam deflecting means causes the path of a laser beam to scan in one plane, a target is displaced in a direction at right angles to said plane of scan and a computer controls the firing of the laser at pre-programmed positions along the scan path, over each scan or selected scans, whereupon a desired dot-matrix marking over an area of the target is obtained, the laser beam path deflecting means includes a mirror arranged in the path of the laser beam, a mirror displacing device is arranged to displace the mirror between two extreme positions defining a predetermined angle and said predetermined angle defining the angle of scan for the path of the laser beam characterized in that the mirror displacing device is arranged to displace the mirror through said predetermined angle in one direction at a rate of displacement faster than the rate of displacement in the other direction and the laser is controlled to fire only while the mirror is being traversed in the direction affording the lower rate of displacement.

2. A laser marking arrangement according to claim 1 characterized in that the mirror displacing device is arranged to displace the laser beam path through its predetermined angle of displacement in a series of steps and the laser is controlled to fire only when the path of the laser beam is relatively stable between successive said steps.

3. A laser marking arrangement according to claim 2 characterized in that said laser beam deflecting means includes two mirror displacing devices.

4. A laser marking arrangement according to claim 1, characterized in that said laser beam deflecting means includes two mirror displacing devices.

5. A laser marking arrangement according to claim 4, characterized in that both said mirror displacing devices act on the mirror to displace the said mirror through its said predetermined angle of displacement.

6. A laser marking arrangement according to claim 5 characterized in that one of said mirror displacing devices has a smaller displacement than the other of said devices and that displacing device having the smaller displacement makes a plurality of complete displacement cycles for each complete displacement cycle made by the other displacing device.

7. A laser marking arrangement according to claim 4, characterized in that each mirror displacing device is arranged to displace a mirror individual thereto and the path of the laser beam is deflected by both mirrors to step through the full scan angle.

8. A laser marking arrangement according to claim 7 characterized in that one of said mirror displacing devices has a smaller displacement than the other of said devices and that displacing device having the smaller displacement makers a plurality of complete displacement cycles for each complete displacement cycle made by the other displacing device.

9. A laser marking arrangement according to claim 4, characterized in that one of said mirror displacing devices has a smaller displacement than the other of said devices and that the displacing device having the smaller displacement makes a plurality of complete displacement cycles for each complete displacement cycle made by the other displacing device.

10. A laser marking arrangement according to claim 9 characterized in that the, or each, mirror displacing device includes an electrical device which undergoes a change of shape in response to electrical signals.

11. A laser marking arrangement according to claim 1, characterized in that the mirror displacing device includes an electrical device which undergoes a change of shape in response to electrical signals.

12. A laser marking arrangement according to claim 11, characterized in that said electrical device is taken from the group consisting of piezo-electric devices, electro-strictive devices and magneto-strictive devices.

13. A laser marking arrangement according to claim 12 characterized in that the, or each, mirror displacing device includes a flexure hinge device.

14. A laser marking arrangement according to claim 1, characterized in that the mirror displacing device includes a flexure hinge device.

15. A laser marking arrangement according to claim 14 characterized by a computer arranged to drive the mirror displacing device and to control the firing of the laser in accordance with a predetermined programme.

16. A laser marking arrangement according to claim 1, characterized by a computer arranged to drive the mirror displacing device and to control the firing of the laser in accordance with a predetermined programme.

* * * * *